(12) United States Patent
Zheng et al.

(10) Patent No.: US 11,422,031 B2
(45) Date of Patent: Aug. 23, 2022

(54) METHOD AND APPARATUS FOR PROCESSING TERAHERTZ SPECTRAL IMAGING DATA

(71) Applicant: Tsinghua University, Beijing (CN)

(72) Inventors: Xiao-Ping Zheng, Beijing (CN); Bin Cao, Beijing (CN); Hua Geng, Beijing (CN); Xiao-Jiao Deng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 325 days.

(21) Appl. No.: 15/930,296

(22) Filed: May 12, 2020

(65) Prior Publication Data

US 2020/0363263 A1   Nov. 19, 2020

(30) Foreign Application Priority Data

May 13, 2019   (CN) .......................... 201910392615.6

(51) Int. Cl.
  *G01J 3/06*   (2006.01)
  *G01J 3/28*   (2006.01)
  *G06V 10/40*  (2022.01)
  *G06V 10/58*  (2022.01)

(52) U.S. Cl.
  CPC .............. *G01J 3/2823* (2013.01); *G01J 3/06* (2013.01); *G01J 3/2803* (2013.01); *G06V 10/40* (2022.01); *G06V 10/58* (2022.01)

(58) Field of Classification Search
  CPC .......... G01N 21/3586; G01J 2003/2826; G01J 3/2823
  See application file for complete search history.

(56) References Cited

U.S. PATENT DOCUMENTS

2014/0070102 A1   3/2014   Globus et al.

FOREIGN PATENT DOCUMENTS

| CN | 1431523 A   | 7/2003  |
|----|-------------|---------|
| CN | 103471715 A | 12/2013 |
| CN | 103558160 A | 2/2014  |
| CN | 105334182 A | 2/2016  |

(Continued)

OTHER PUBLICATIONS

Zhimin Xu, "Hyperspectral Reconstruction in Biomedical Imaging Using Terahertz Systems", 2010 (Year: 2010).*

(Continued)

*Primary Examiner* — Maurice C Smith (57) ABSTRACT

A method for collecting and processing terahertz spectral imaging data includes: scanning an object to generate terahertz spectral data having a hyper- or low-spectral resolution respectively at a plurality of pixel points; collecting the terahertz spectral data and recording coordinate data of each pixel point, thereby obtaining a mixed data including a hyper-spectral data and a low-spectral data corresponding to different pixel points; constructing a hyper-spatial and low-spectral imaging data-cube from the mixed data; extracting a hyper-spectral data-set from the mixed data; and reconstructing a hyper-spatial and hyper-spectral imaging data-cube from the hyper-spatial and low-spectral imaging data-cube based on the hyper-spectral data-set. A terahertz spectral imaging apparatus is further provided.

19 Claims, 4 Drawing Sheets

(56) References Cited

FOREIGN PATENT DOCUMENTS

CN          105527242 A     4/2016
CN          105548083 A     5/2016

OTHER PUBLICATIONS

Yang Bai, "A New Perspective on Terahertz Image Reconstruction Based on Linear Spectral Unmixing", 2008 (Year: 2008).*
Hiyong Li, "Estimating the Number of Endmembers From Hyperspectral Image Using Noncentral Chisquared Distribution Model", 2016 IEEE (Year: 2016).*

* cited by examiner

METHOD AND APPARATUS FOR PROCESSING TERAHERTZ SPECTRAL IMAGING DATA

CROSS-REFERENCE TO RELATED APPLICATIONS

This application claims all benefits accruing under 35 U.S.C. § 119 from China Patent Application No. 201910392615.6 filed on May 13, 2019 in the China National Intellectual Property Administration, the contents of which are incorporated by reference herein.

FIELD

The present disclosure relates to terahertz spectral imaging technology, and particularly to a method and an apparatus for collecting and processing terahertz spectral imaging data.

BACKGROUND

Hyper-spectral imaging technology has been applied more and more in various fields such as remote sensing, food science, environmental monitoring, and bio-medical research. Hyper-spectral imaging involves methods and apparatuses for acquiring hyper-spectral data-sets or data-cubes, which may include finely resolved spectral information massive sampled at each pixel. Terahertz waves are electromagnetic waves between infrared waves and microwaves, and possess unique spectral characteristics, high penetration, and low energy requirement, which are desirable for the hyper-spectral imaging.

SUMMARY

A method for collecting and processing terahertz spectral imaging data according to an embodiment in the present disclosure includes:

scanning an object with a terahertz pulse to generate terahertz spectral data having a hyper-spectral resolution or a low-spectral resolution respectively at a plurality of pixel points having a hyper-spatial resolution, one pixel point is scanned in the hyper-spectral resolution for every M coordinate points in an x-axis and every N coordinate points in a y-axis perpendicular to the x-axis, remaining pixel points are scanned in the low-spectral resolution, wherein $M \geq 1$ and $N \geq 2$, or $M \geq 2$ and $N \geq 1$;

collecting the terahertz spectral data having the hyper-spectral resolution and the low-spectral resolution at the plurality of pixel points, and recording coordinate data of each of the plurality of pixel points, thereby obtaining mixed data including hyper-spectral data and low-spectral data corresponding to different pixel points;

constructing a hyper-spatial and low-spectral imaging data-cube from the mixed data by decreasing the spectral resolution of the hyper-spectral data to be substantially the same as that of the low-spectral data;

extracting a hyper-spectral data-set from the mixed data, the hyper-spectral data-set including the hyper-spectral data; and reconstructing a hyper-spatial and hyper-spectral imaging data-cube by increasing the spectral-resolution of the hyper-spatial and low-spectral imaging data-cube via the hyper-spectral data-set.

A method for collecting and processing terahertz spectral imaging data according to another embodiment in the present disclosure includes:

scanning an object with a terahertz pulse to generate terahertz spectral data having a hyper-spectral resolution or a low-spectral resolution respectively at a plurality of pixel points having a hyper-spatial resolution, one pixel point is scanned in the hyper-spectral resolution for every M coordinate points in an x-axis and every N coordinate points in a y-axis perpendicular to the x-axis, remaining pixel points are scanned in the low-spectral resolution, wherein $M \geq 1$ and $N \geq 2$, or $M \geq 2$ and $N \geq 1$;

collecting the terahertz spectral data having the hyper-spectral resolution and the low-spectral resolution at the plurality of pixel points, and recording coordinate data of each of the plurality of pixel points, thereby obtaining mixed data including hyper-spectral data and low-spectral data corresponding to different pixel points;

extracting a hyper-spatial and low-spectral imaging data-cube from the mixed data, the hyper-spatial and low-spectral imaging data-cube including the low-spectral data and the coordinate data corresponding to the low-spectral data;

extracting a hyper-spectral data-set from the mixed data, the hyper-spectral data-set including the hyper-spectral data;

reconstructing a hyper-spatial and hyper-spectral imaging data-cube by increasing the spectral-resolution of the hyper-spatial and low-spectral imaging data-cube via the hyper-spectral data-set; and replacing the lower-spectral data in the mixed data with reconstructed hyper-spectral data included in the hyper-spatial and hyper-spectral imaging data-cube corresponding to the same coordinate data as the lower-spectral data, thereby obtaining a final hyper-spatial and hyper-spectral imaging data-cube.

A terahertz spectral imaging apparatus includes a terahertz spectral imaging device and a computer. The terahertz spectral imaging device is configured to scan an object with a terahertz pulse to generate terahertz spectral data having a hyper-spectral resolution or a low-spectral resolution respectively at a plurality of pixel points. The plurality of pixel points has a hyper-resolution. One pixel point is scanned in the hyper-spectral resolution for every M coordinate points in an x-axis and every N coordinate points in a y-axis perpendicular to the x-axis, remaining pixel points are scanned in the low-spectral resolution, wherein $M \geq 1$ and $N \geq 2$, or $M \geq 2$ and $N \geq 1$.

The computer is configured to collect the terahertz spectral data having the hyper-spectral resolution and the low-spectral resolution at the plurality of pixel points, and record coordinate data of each of the plurality of pixel points, thereby obtaining mixed data including hyper-spectral data and low-spectral data corresponding to different pixel points.

The computer includes at least one processor and a memory connected to the at least one processor. The memory is configured to store operation instructions executed by the at least one processor.

In an embodiment, when the operation instructions being executed, the processor executes: constructing a hyper-spatial and low-spectral imaging data-cube from the mixed data by decreasing the spectral resolution of the hyper-spectral data to be substantially the same as that of the low-spectral data; extracting a hyper-spectral data-set from the mixed data, the hyper-spectral data-set including the hyper-spectral data; and reconstructing a hyper-spatial and hyper-spectral imaging data-cube by increasing the spectral-resolution of the hyper-spatial and low-spectral imaging data-cube via the hyper-spectral data-set.

In another embodiment, when the operation instructions being executed, the processor executes: extracting a hyper-spatial and low-spectral imaging data-cube from the mixed data, the hyper-spatial and low-spectral imaging data-cube including the low-spectral data and the coordinate data corresponding to the low-spectral data; extracting a hyper-spectral data-set from the mixed data, the hyper-spectral data-set including the hyper-spectral data; reconstructing a hyper-spatial and hyper-spectral imaging data-cube by increasing the spectral-resolution of the hyper-spatial and low-spectral imaging data-cube via the hyper-spectral data-set; and replacing the lower-spectral data in the mixed data with reconstructed hyper-spectral data included in the hyper-spatial and hyper-spectral imaging data-cube corresponding to the same coordinate data, thereby obtaining a final hyper-spatial and hyper-spectral imaging data-cube.

In the present disclosure, hyper-spectral data is collected at a small fraction of the pixel points, and low-spectral data is collected at a large fraction of the pixel points. Since the numbers of data in time domain sampled at the large fraction of the pixel points are decreased, the total data number in the present disclosure is significantly decreased. Thus, the total scanning time is decreased, and the sampling efficiency is increased. In addition, by processing the mixed data to obtain the hyper-spatial and hyper-spectral imaging data-cube, a spectral image of the object with a hyper-spatial resolution and a hyper-spectral resolution can still be obtained.

BRIEF DESCRIPTION OF THE DRAWINGS

Implementations are described by way of example only with reference to the attached figures.

DETAILED DESCRIPTION

For a clear understanding of the technical features, objects and effects of the present disclosure, specific embodiments of the present disclosure will now be described in detail with reference to the accompanying drawings. It is to be understood that the following description is merely exemplary embodiments of the present disclosure, and is not intended to limit the scope of the present disclosure.

Figure 1:
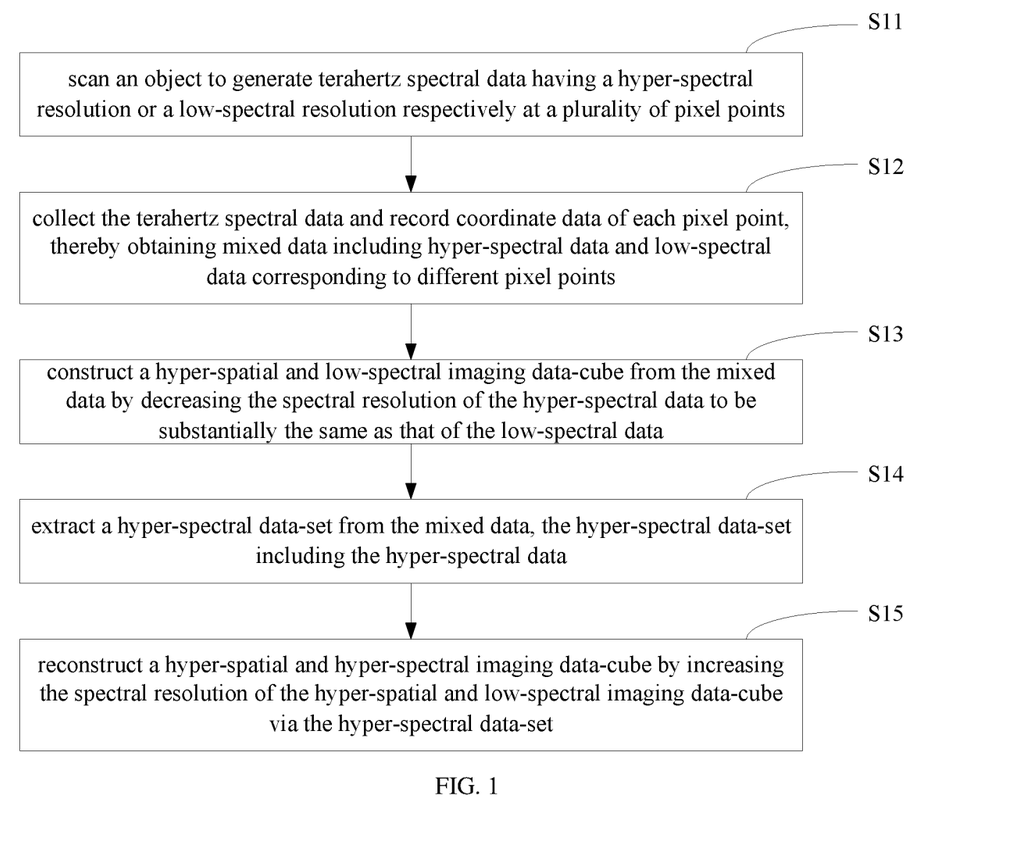
FIG. 1 is a flowchart of a method for collecting and processing terahertz spectral imaging data according to an embodiment of the present disclosure.

A first method for collecting and processing terahertz spectral imaging data is provided in the present disclosure. Referring to FIG. 1, the first method can include:

S11, scanning an object with a terahertz pulse to generate terahertz spectral data having a hyper-spectral resolution or a low-spectral resolution (hereinafter hyper-spectral or low-spectral data) respectively at a plurality of pixel points (i.e. spatial sampling points) having a hyper-spatial resolution, one pixel point is scanned in the hyper-spectral resolution for every M coordinate points in an x-axis and every N coordinate points in a y-axis perpendicular to the x-axis, remaining pixel points are scanned in the low-spectral resolution, wherein M≥1 and N≥2, or M≥2 and N≥1;

S12, collecting the terahertz spectral data having the hyper-spectral resolution and the low-spectral resolution at the plurality of pixel points, and recording coordinate data of each of the plurality of pixel points, thereby obtaining mixed data including hyper-spectral data and low-spectral data corresponding to different pixel points;

S13, constructing a hyper-spatial and low-spectral imaging data-cube from the mixed data by decreasing the spectral resolution of the hyper-spectral data to be substantially the same as that of the low-spectral data;

S14, extracting a hyper-spectral data-set from the mixed data, the hyper-spectral data-set including the hyper-spectral data; and S15, reconstructing a hyper-spatial and hyper-spectral imaging data-cube by increasing the spectral-resolution of the hyper-spatial and low-spectral imaging data-cube via the hyper-spectral data-set.

The term "hyper-spatial" as used in this disclosure can also be referred as "hyper-spatial resolution". The higher the spatial resolution, the more the plurality of pixel points, and the denser the plurality of pixel points scanned on the object.

The term "hyper-spectral" as used in this disclosure can also be referred as "hyper-spectral resolution". Hyper-spectral data can contain spectral information with a relatively high resolution at a pixel point. On the contrary, the term "low-spectral" as used in this disclosure can also be referred as "low-spectral resolution". Low-spectral data can contain spectral information with a relatively low resolution at a pixel point as compared to that of the hyper-spectral data.

The spectral resolution can be regulated by regulating a sampling period in time domain at each pixel point. The longer the sampling period in time domain used for one pixel point, the more the data in time domain sampled at this pixel point, and the higher the spectral resolution of the spectral data obtained at this pixel point.

In a related method for collecting and processing terahertz spectral imaging data, a hyper-spatial and hyper-spectral imaging data-cube is acquired at once by collecting hyper-spectral data at each of a plurality of pixel points (i.e. spatial sampling points), and the plurality of pixel points have a hyper-spatial resolution. A total data number of the related method can be calculated according to the following equation (I):

$$S = X \times Y \times Z \quad \text{(I)};$$

wherein S denotes the total data number, X denotes a number of pixel points in the X axis, Y denotes a number of pixel points in the Y axis, and Z denotes a number of data in time domain sampled at each pixel point.

Since X, Y, and Z all have to be large enough in order to obtain the hyper-spatial resolution and the hyper-spectral resolution, the total data number is huge, thereby significantly decreasing the efficiency of the related method. In order to accelerate the sampling operation, a rapid scanning device which is generally very expensive must be purchased.

In the present method, a total number of the plurality of pixel points can be substantially the same as a total number (i.e. X×Y) of the pixel points collected in the above-described related method in order to achieve a hyper-spatial resolution. The hyper-spectral data can have a spectral resolution substantially the same as that of the spectral data collected by the above-described related method. However, the hyper-spectral data are not collected at all of the plurality of pixel points. Instead, the hyper-spectral data is collected at a small fraction of the pixel points, and the low-spectral data is collected at a large fraction of the pixel points. Since the low-spectral data has a relatively low-spectral resolution as compared to that of the hyper-spectral data, the numbers of data in time domain sampled at the large fraction of the pixel points are decreased, thereby significantly decreasing the total data number of the method in the present disclosure. As a consequence, the total scanning time is decreased, and the sampling efficiency is increased. Therefore, the method in the present disclosure can accelerate the sampling operation for an ordinary scanning device. In addition, by processing the mixed data to obtain the hyper-spatial and hyper-spectral imaging data-cube, a spectral image of the object with a hyper-spatial resolution and a hyper-spectral resolution can still be obtained.

In the S11, the object can be any object that requires to be detected or to have its terahertz spectral image obtained. The mixed data can be a set of data collected at the plurality of pixel points. A format of data can be determined according to actual detection or imaging requirements. The mixed data includes the coordinate data and the spectral data (i.e., the hyper-spectral data or the low-spectral data) of each of the plurality of pixel points. The coordinate data can include values of coordinate points in the x-axis and in the y-axis of each pixel point. The spectral data can include a terahertz time domain spectrum at each pixel point.

In an embodiment, S11 can include regulating a sampling period in time domain for scanning each of the plurality of pixel points. A sampling period T1 in time domain for scanning in the hyper-spectral resolution can be larger than a sampling period T2 in time domain for scanning in the lower-spectral resolution.

In an embodiment, a ratio of the sampling period T1 to the sampling period T2 can be larger than or equal to 2.

M and N both are integers. The values of M and N can be set according to actual needs.

In an embodiment, $$\frac{(R-1)}{MNR} + \frac{1}{R} < 1,$$

wherein R is the ratio of the sampling period T1 to the sampling period T2. The smaller the $$\frac{(R-1)}{MNR} + \frac{1}{R},$$

the higher the sampling efficiency of the method in the present disclosure.

In an embodiment, the pixel points scanned in the hyper-spectral resolution are uniformly spaced in the x-axis and/or in the y-axis.

In an embodiment, the regulating the sampling period in time domain for scanning each of the plurality of pixel points can include: regulating a time delay, between a pump pulse and a probe pulse generated by a terahertz spectral imaging device, used to scan each pixel point.

In S13, since the hyper-spectral data at a pixel point has a relatively large spectral dimension number, a low-spectral data having a relatively small spectral dimension number can be extracted or generated from the hyper-spectral data by decreasing the spectral dimension number. Consequently, the hyper-spatial and low-spectral imaging data-cube can be constructed by decreasing the spectral resolution of the hyper-spectral data in the mixed data.

In S14, the hyper-spectral data-set can include only the spectral data but no coordinate data at the small fraction of the pixel points.

In S15, by increasing the spectral-resolution of the hyper-spatial and low-spectral imaging data-cube, the hyper-spatial and hyper-spectral imaging data-cube having a hyper-spatial resolution and a hyper-spectral resolution can be obtained.

The spectral data collected is generally time domain spectral data. The reconstructing can be performed by using the time domain spectral data. After the reconstructing, the time domain spectral data in the hyper-spatial and hyper-spectral imaging data-cube can be further transformed to frequency domain spectral data by Fourier transform. Alternatively, the time domain spectral data can be transformed to frequency domain spectral data by Fourier transform before the reconstructing, and the reconstructing can be performed by using the frequency domain spectral data.

The reconstructing the hyper-spatial and hyper-spectral imaging data-cube in S15 can be achieved by, for example, a wiener estimation method, a pseudo-inverse method, a neural network based method, a deep learning method, etc.

In an embodiment, the reconstructing the hyper-spatial and hyper-spectral imaging data-cube can include:

S151, transforming the hyper-spatial and low-spectral imaging data-cube into a matrix S and transforming the hyper-spectral data-set into a matrix F;

S152, extracting a transition matrix T from the matrix F, the matrix T having the same spectral curve number (for example, number of the terahertz time domain spectrum) as that of the transition matrix F and the same spectral resolution as that of the matrix S;

S153, reconstructing a complete data matrix R according to an equation R=F×pinv(T)×S by a pseudo-inverse method, the complete data matrix R having the same spectral curve number as that of the matrix S and the same spectral sampling point number as that of the matrix F; and S154, transforming the complete data matrix R into the hyper-spatial and hyper-spectral imaging data-cube.

Figure 2:
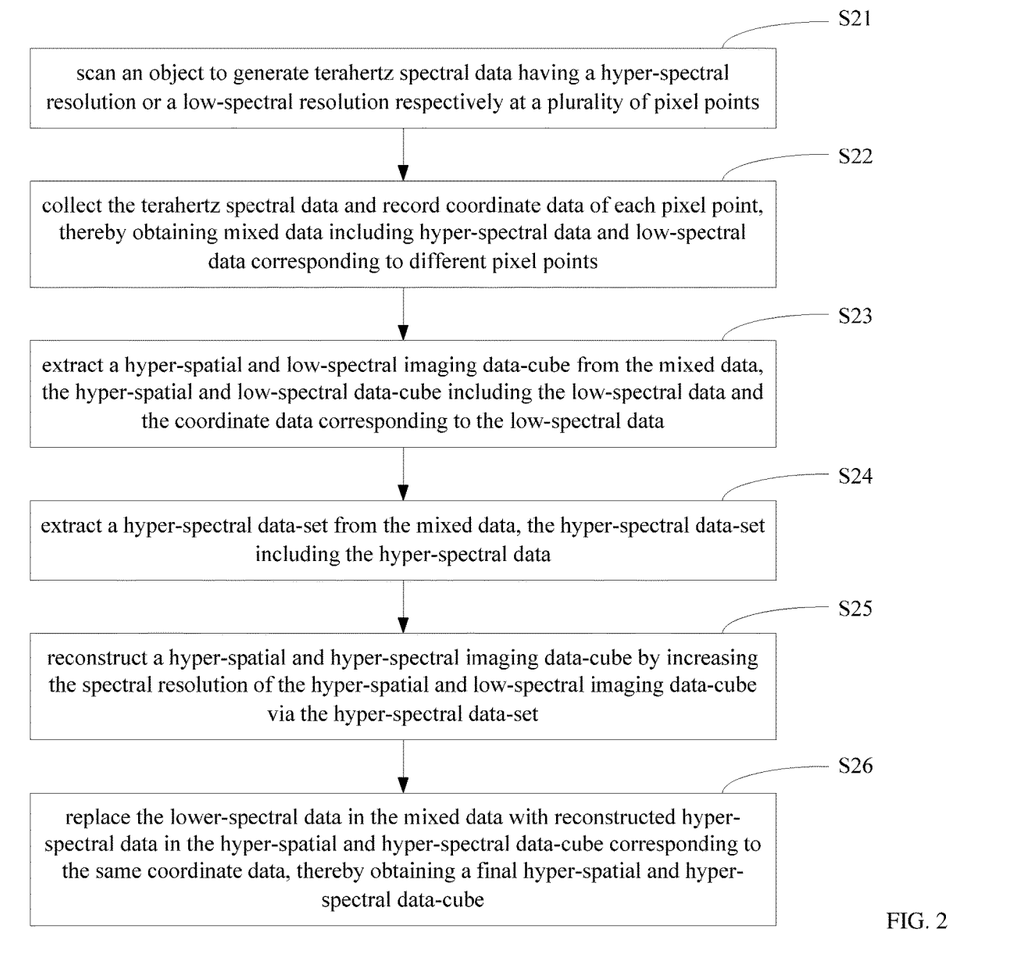
FIG. 2 is a flowchart of a method for collecting and processing terahertz spectral imaging data according to another embodiment of the present disclosure.

A second method for collecting and processing terahertz spectral imaging data is provided in the present disclosure. Referring to FIG. 2, the second method can include:

S21, scanning an object with a terahertz pulse to generate terahertz spectral data having a hyper-spectral resolution or a low-spectral resolution (hereinafter hyper-spectral or low-spectral data) respectively at a plurality of pixel points (i.e. spatial sampling points) having a hyper-spatial resolution, one pixel point is scanned in the hyper-spectral resolution for every M coordinate points in an x-axis and every N coordinate points in a y-axis perpendicular to the x-axis, remaining pixel points are scanned in the low-spectral resolution, wherein M≥1 and N≥2, or M≥2 and N≥1;

S22, collecting the terahertz spectral data having the hyper-spectral resolution and the low-spectral resolution at the plurality of pixel points, and recording coordinate data of each of the plurality of pixel points, thereby obtaining mixed data including hyper-spectral data and low-spectral data corresponding to different pixel points;

S23, extracting a hyper-spatial and low-spectral imaging data-cube from the mixed data, the hyper-spatial and low-spectral imaging data-cube including the low-spectral data and the coordinate data corresponding to the low-spectral data;

S24, extracting a hyper-spectral data-set from the mixed data, the hyper-spectral data-set including the hyper-spectral data;

S25, reconstructing a hyper-spatial and hyper-spectral imaging data-cube by increasing the spectral-resolution of the hyper-spatial and low-spectral imaging data-cube via the hyper-spectral data-set; and S26, replacing the lower-spectral data in the mixed data with reconstructed hyper-spectral data included in the hyper-spatial and hyper-spectral imaging data-cube obtained from S25 corresponding to the same coordinate data as the lower-spectral data, thereby obtaining a final hyper-spatial and hyper-spectral imaging data-cube.

The S21, S22, S24, and S25 in the second method are substantially and respectively the same as the S11, S12, S14, and S15 in the first method and will not be described in detail herein.

The S23 in the second method is different from the S13 in the first method. In S13, the hyper-spatial and low-spectral imaging data-cube includes spatial data and spectral data of each of the plurality of the pixel points, and the hyper-spatial and hyper-spectral imaging data-cube reconstructed in S15 is a final hyper-spatial and hyper-spectral imaging data-cube.

In S23, the hyper-spatial and low-spectral imaging data-cube includes spatial data and spectral data of the large fraction of the pixel points, and thus the hyper-spatial and hyper-spectral imaging data-cube reconstructed in S25 also includes spatial data and spectral data of the large fraction of the pixel points. Therefore, the S26 should be performed to obtain the final hyper-spatial and hyper-spectral imaging data-cube.

It should be understood that although each step may be displayed in succession as indicated, these steps may not necessarily be executed in succession in the order indicated by the arrows of FIG. 1 and FIG. 2. Unless expressly described herein, the execution of these steps may not be limited to a strict order; instead, the steps can be executed in another order. In addition, at least some steps may include multiple sub-steps or multiple stages. These sub-steps or stages may not necessarily be executed or completed at the same moment, but can be executed at different times, and the order of execution thereof may also not necessarily be in succession, but can be executed in turn or alternately with at least some other steps or sub-steps or stages of other steps.

Figure 3:
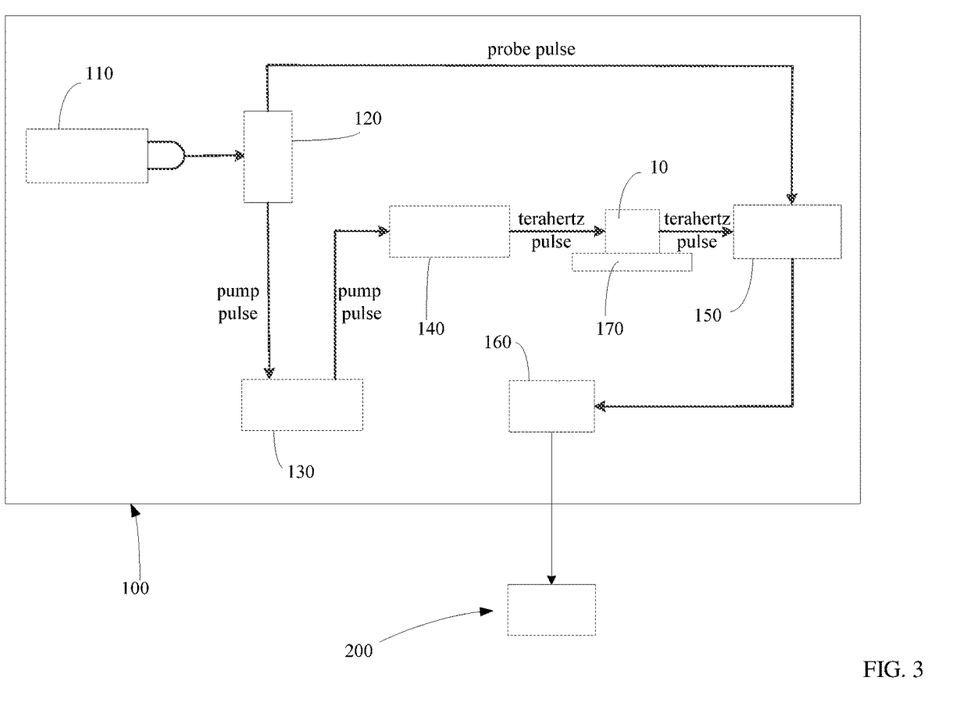
FIG. 3 is a schematic view of a terahertz spectral imaging apparatus according to an embodiment of the present disclosure.

Referring to FIG. 3, a terahertz spectral imaging apparatus is further provided in the present disclosure. The terahertz spectral imaging apparatus includes a terahertz spectral imaging device 100 and a computer 200. The terahertz spectral imaging device 100 is configured to scan the object with a terahertz pulse. The computer 200 is configured to control the terahertz spectral imaging device 100 and process information generated in the scanning of the object.

In an embodiment, the terahertz spectral imaging device 100 includes a laser generator 110, a beam splitter 120, a time delayer 130, a terahertz pulse generator 140, a terahertz detector 150, a lock-in amplifier 160, and an electronically controlled two-dimensionally moveable platform 170. The laser generator 110 can generate a laser pulse. The beam splitter 120 can split the laser pulse into a pump pulse and a probe pulse. The time delayer 130 is configured to receive the pump pulse, and regulate a time delay of the pump pulse relative to the probe pulse. The terahertz pulse generator 140 can generate a terahertz pulse in response to the time-delayed pump pulse. The terahertz detector 150 is configured to receive the terahertz pulse passed through the object 10 to be detected and the probe pulse, and output an electrical signal. The electrical signal reflect terahertz time-domain spectral signal. The lock-in amplifier 160 is configured to amplify the electrical signal output from the terahertz detector 150 and output the amplified signal to the computer 200. The two-dimensionally moveable platform 170 is configured to support the object 10 to be detected at a place where the terahertz pulse generated from the terahertz signal generator 140 can pass through or reflected by the object 10. The object 10 can be placed on the two-dimensionally moveable platform 170 and moved with the two-dimensionally moveable platform 170 in the x-axis and y-axis. The laser generator 110 can be, for example, a femtosecond laser generator. The terahertz pulse generator 140 can use a photoconductive antenna or a non-linear optic crystal.

The computer 200 can be respectively and electrically connected to the time delayer 130, the lock-in amplifier 160, and the two-dimensionally moveable platform 170. The computer 200 can be configured to control a movement of the two-dimensionally moveable platform 170 and thus a movement of the object 10, and record the coordinate data of each pixel point. The computer 200 can be further configured to control the terahertz spectral imaging device 100 to regulate the sampling period in time domain for scanning each pixel point. The computer 200 can be configured to control the time delayer 130 to regulate the time delay between the pump pulse and the probe pulse so as to regulate the sampling period and sampling points in time domain for scanning each pixel point.

Figure 4:
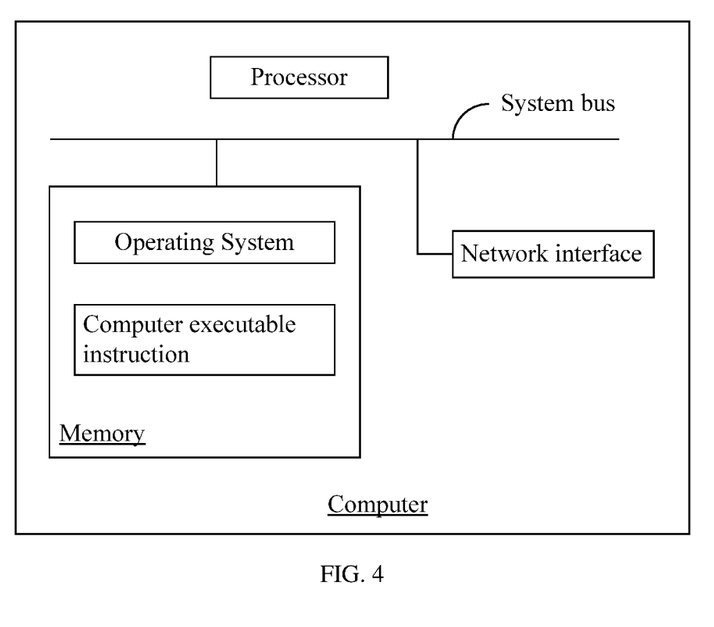
FIG. 4 is a block view of a computer of a terahertz spectral imaging apparatus according to an embodiment of the present disclosure.

Referring to FIG. 4, the computer 200 can include a processor, a memory, a network interface, an output device, and an input device, which are connected through a system bus. The processor is configured to provide computing and controlling capabilities to support the operation of the entire computer 200. The memory of the computer 200 stores an operating system and computer executable instructions. The computer executable instructions are capable of being executed by the processor to implement the steps S12 to S15, S22 to S26, and/or the step of controlling the terahertz spectral imaging device 100 to scan the object (for example, controlling the terahertz spectral imaging device 100 to regulate the sampling period in time domain for scanning each of the plurality of pixel points, and/or controlling the movement of the two-dimensionally moveable platform 170) in the method according to any one of the above-described embodiments. The memory in the computer 200 also provides an operating environment for the operating system and the computer executable instructions. The network interface is configured to be connected to the device 100.

It should be understood that FIG. 4 is a block view simply showing the parts in the computer 200 that are related to the present application, and does not constitute a limitation on the computer 200 which the present disclosure can be applied to. The specific computer can include more or fewer parts compared with that shown in the drawings, or can be in combination with certain parts, or can have different parts.

During the scanning, the laser pulse generated by the laser generator 110 reaches the beam splitter 120 and is splitter into the pump pulse and the probe pulse by the beam splitter 120. The pump pulse passes through the time delayer 130 and reaches the terahertz radiation generator 140 to cause the terahertz radiation generator 140 to generate the terahertz pulse. The terahertz pulse reaches the object 10 located on the two-dimensionally moveable platform 170, passes through or reflected by the object 10, and reaches the terahertz detector 150. The probe pulse reaches the terahertz detector 150 simultaneously with the terahertz pulse, so that the terahertz detector 150 can generate the spectral signal. The spectral signal is then amplified by the lock-in amplifier 160, transmitted to the computer 200, and processed by the computer 200.

A non-volatile computer-readable storage medium is further provided in the present disclosure. The non-volatile computer-readable storage medium stores computer-executable instructions which implement the steps S12 to S15, S22 to S26, and/or the step of controlling the terahertz spectral imaging device 100 to scan the object (for example, controlling the terahertz spectral imaging device 100 to regulate the sampling period in time domain for scanning each of the plurality of pixel points, and/or controlling the movement of the two-dimensionally moveable platform 170) in the method according to any one of the above-described embodiments.

It should be noted that those skilled in the art will appreciate that all or part of the steps S20 to S50 in the method according to any one of the above embodiments can be implemented by related hardware under instructions of a program, which is stored in the memory, and when the program is implemented, the steps S12 to S15, or S22 to S26 in the method according to any one of the above embodiments can be included. The memory may be a magnetic disk, optical disk, read-only memory (ROM), random access memory (RAM), or the like.

The technical features of the above-described embodiments may be arbitrarily combined. In order to make the description simple, not all possible combinations of the technical features in the above embodiments are described. However, as long as there is no contradiction in the combination of these technical features, the combinations should be in the scope of the present application.

What described above are only several implementations of the present application, and these embodiments are specific and detailed, but not intended to limit the scope of the present application. It should be understood by the skilled in the art that various modifications and improvements can be made without departing from the conception of the present application, and all fall within the protection scope of the present application. Therefore, the patent protection scope of the present application is defined by the appended claims.

What is claimed is:

1. A method for collecting and processing terahertz spectral imaging data, comprising:
   scanning an object with a terahertz pulse to generate terahertz spectral data having a hyper-spectral resolution or a low-spectral resolution respectively at a plurality of pixel points having a hyper-spatial resolution, one pixel point is scanned in the hyper-spectral resolution for every M coordinate points in an x-axis and every N coordinate points in a y-axis perpendicular to the x-axis, remaining pixel points are scanned in the low-spectral resolution, wherein M≥1 and N≥2, or M≥2 and N≥1;
   collecting the terahertz spectral data having the hyper-spectral resolution and the low-spectral resolution at the plurality of pixel points, and recording coordinate data of each of the plurality of pixel points, thereby obtaining mixed data comprising hyper-spectral data and low-spectral data corresponding to different pixel points;
   constructing a hyper-spatial and low-spectral imaging data-cube from the mixed data by decreasing the spectral resolution of the hyper-spectral data to be substantially the same as that of the low-spectral data;
   extracting a hyper-spectral data-set from the mixed data, the hyper-spectral data-set comprising the hyper-spectral data; and
   reconstructing a hyper-spatial and hyper-spectral imaging data-cube by increasing the spectral-resolution of the hyper-spatial and low-spectral imaging data-cube via the hyper-spectral data-set.

2. The method of claim 1, wherein the scanning the object comprises:
   regulating a sampling period in time domain for scanning each of the plurality of pixel points, the sampling period T1 in time domain for scanning in the hyper-spectral resolution is larger than the sampling period T2 in time domain for scanning in the low-spectral resolution.

3. The method of claim 2, wherein a ratio of the sampling period T1 to the sampling period T2 is larger than or equal to 2.

4. The method of claim 2, wherein $$\frac{(R-1)}{MNR} + \frac{1}{R} > 1,$$

wherein R is a ratio of the sampling period T1 to the sampling period T2.

5. The method of claim 1, the reconstructing the hyper-spatial and hyper-spectral imaging data-cube is achieved by a wiener estimation method, a pseudo-inverse method, a neural network based method, or a deep learning method.

6. The method of claim 1, wherein the pixel points scanned in the hyper-spectral resolution are uniformly spaced in the x-axis and/or in the y-axis.

7. A method for collecting and processing terahertz spectral imaging data, comprising:
   scanning an object with a terahertz pulse to generate terahertz spectral data having a hyper-spectral resolution or a low-spectral resolution respectively at a plurality of pixel points having a hyper-spatial resolution, one pixel point is scanned in the hyper-spectral resolution for every M coordinate points in an x-axis and every N coordinate points in a y-axis perpendicular to the x-axis, remaining pixel points are scanned in the low-spectral resolution, wherein M≥1 and N≥2, or M≥2 and N≥1;
   collecting the terahertz spectral data having the hyper-spectral resolution and the low-spectral resolution at the plurality of pixel points, and recording coordinate data of each of the plurality of pixel points, thereby obtaining mixed data comprising hyper-spectral data and low-spectral data corresponding to different pixel points;
   extracting a hyper-spatial and low-spectral imaging data-cube from the mixed data, the hyper-spatial and low-spectral imaging data-cube comprising the low-spectral data and the coordinate data corresponding to the low-spectral data;
   extracting a hyper-spectral data-set from the mixed data, the hyper-spectral data-set comprising the hyper-spectral data;
   reconstructing a hyper-spatial and hyper-spectral imaging data-cube by increasing the spectral-resolution of the hyper-spatial and low-spectral imaging data-cube via the hyper-spectral data-set; and
   replacing the lower-spectral data in the mixed data with reconstructed hyper-spectral data included in the hyper-spatial and hyper-spectral imaging data-cube corresponding to the same coordinate data as the lower-spectral data, thereby obtaining a final hyper-spatial and hyper-spectral imaging data-cube.

8. The method of claim 7, wherein the scanning the object comprises:
regulating a sampling period in time domain for scanning each of the plurality of pixel points, the sampling period T1 in time domain for scanning in the hyper-spectral resolution is larger than the sampling period T2 in time domain for scanning in the low-spectral resolution.

9. The method of claim 8, wherein a ratio of the sampling period T1 to the sampling period T2 is larger than or equal to 2.

10. The method of claim 8, wherein $$\frac{(R-1)}{MNR} + \frac{1}{R} < 1,$$

wherein R is a ratio of the sampling period T1 to the sampling period T2.

11. The method of claim 7, the reconstructing the hyper-spatial and hyper-spectral imaging data-cube is achieved by a wiener estimation method, a pseudo-inverse method, a neural network based method, or a deep learning method.

12. The method of claim 7, wherein the pixel points scanned in the hyper-spectral resolution are uniformly spaced in the x-axis and/or in the y-axis.

13. A terahertz spectral imaging apparatus, comprising:
a terahertz spectral imaging device configured to scan an object with a terahertz pulse to generate terahertz spectral data having a hyper-spectral resolution or a low-spectral resolution respectively at a plurality of pixel points having a hyper-resolution, wherein one pixel point is scanned in the hyper-spectral resolution for every M coordinate points in an x-axis and every N coordinate points in a y-axis perpendicular to the x-axis, remaining pixel points are scanned in the low-spectral resolution, wherein M≥1 and N≥2, or M≥2 and N≥1;
a computer configured to collect the terahertz spectral data having the hyper-spectral resolution and the low-spectral resolution at the plurality of pixel points, and record coordinate data of each of the plurality of pixel points, thereby obtaining mixed data comprising hyper-spectral data and low-spectral data corresponding to different pixel points;
wherein the computer comprises at least one processor; and
a memory connected to the at least one processor, wherein the memory is configured to store operation instructions executed by the at least one processor,
while the operation instructions being executed, the processor executes:
constructing a hyper-spatial and low-spectral imaging data-cube based on the mixed data;
extracting a hyper-spectral data-set from the mixed data, the hyper-spectral data-set comprising the hyper-spectral data; and
reconstructing a hyper-spatial and hyper-spectral imaging data-cube by increasing the spectral resolution of the hyper-spatial and hyper-spectral imaging data-cube via the hyper-spectral data-set.

14. The terahertz spectral imaging apparatus of claim 13, wherein the computer is configured to control the terahertz spectral imaging device to regulate a sampling period in time domain for scanning each of the plurality of pixel points, the sampling period T1 in time domain for scanning in the hyper-spectral resolution being larger than the sampling period T2 in time domain for scanning in the low-spectral resolution.

15. The terahertz spectral imaging apparatus of claim 14, wherein the a ratio of the sampling period T1 to the sampling period T2 is larger than or equal to 2.

16. The terahertz spectral imaging apparatus of claim 14, wherein $$\frac{(R-1)}{MNR} + \frac{1}{R} < 1,$$

wherein R is a ratio of the sampling period T1 to the sampling period T2.

17. The terahertz spectral imaging apparatus of claim 13, wherein the constructing a hyper-spatial and low-spectral imaging data-cube based on the mixed data comprises: decreasing the spectral resolution of the hyper-spectral data in the mixed data to be substantially the same as that of the low-spectral data.

18. The terahertz spectral imaging apparatus of claim 13, wherein the constructing a hyper-spatial and low-spectral imaging data-cube based on the mixed data comprises: extracting a hyper-spatial and low-spectral imaging data-cube from the mixed data, the hyper-spatial and low-spectral imaging data-cube comprising the low-spectral data and the coordinate data corresponding to the low-spectral data.

19. The terahertz spectral imaging apparatus of claim 18, wherein while the operation instructions are being executed, the processor further executes:
replacing the lower-spectral data in the mixed data with reconstructed hyper-spectral data included in the hyper-spatial and hyper-spectral imaging data-cube corresponding to the same coordinate data as the lower-spectral data, thereby obtaining a final hyper-spatial and hyper-spectral imaging data-cube.

* * * * *